(12) United States Patent
Kimura et al.

(10) Patent No.: US 8,574,128 B2
(45) Date of Patent: Nov. 5, 2013

(54) CONTROL APPARATUS FOR A VEHICLE

(75) Inventors: Shigeru Kimura, Toyota (JP); Naoki Itazu, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 273 days.

(21) Appl. No.: 13/147,293

(22) PCT Filed: Feb. 6, 2009

(86) PCT No.: PCT/JP2009/052059
§ 371 (c)(1),
(2), (4) Date: Aug. 1, 2011

(87) PCT Pub. No.: WO2010/089878
PCT Pub. Date: Aug. 12, 2010

(65) Prior Publication Data
US 2011/0294622 A1    Dec. 1, 2011

(51) Int. Cl.
*B60W 10/04* (2006.01)
*F16H 59/74* (2006.01)

(52) U.S. Cl.
USPC .............. 477/185; 477/99; 477/203; 477/906

(58) Field of Classification Search
USPC ......... 477/183, 184, 185, 189, 192, 203, 218, 477/99, 906
See application file for complete search history.

(56) References Cited

U.S. PATENT DOCUMENTS

| | | | |
|---|---|---|---|
| 6,527,670 B1 | 3/2003 | Gierer et al. | |
| 7,374,511 B2* | 5/2008 | Berger et al. | 477/99 |
| 2003/0144112 A1* | 7/2003 | Burgbacher et al. | 477/99 |
| 2009/0111648 A1* | 4/2009 | Hecht et al. | 477/92 |
| 2009/0176619 A1* | 7/2009 | Inoue | 477/96 |

FOREIGN PATENT DOCUMENTS

| | | |
|---|---|---|
| JP | 6-174085 A | 6/1994 |
| JP | 2002-533631 A | 10/2002 |
| JP | 2004-360580 A | 12/2004 |

* cited by examiner

*Primary Examiner* — Roger Pang
(74) *Attorney, Agent, or Firm* — Sughrue Mion, PLLC

(57) ABSTRACT

Providing a control apparatus for a vehicle having a parking lock device 50 which is placed in its released state with a hydraulic pressure generated by an oil pump 58 operated by an engine 26, which control apparatus permits reduction of a risk of unintended releasing of the parking lock device 50 upon occurrence of an operating failure of an ON-OFF switching valve 72 or a switching valve 70 of a hydraulic device 69 provided to supply the hydraulic pressure.

Engine start restricting means 92 is configured to restrict starting of the engine 26 when a component of the hydraulic device 69 provided to operate the parking lock device 50 has an operating failure that causes the parking lock device 50 to be held in its released state, as compared with the starting when the component does not have the operating failure, so that the engine start restricting means 92 reduces a risk of releasing of the parking lock device 50 due to application of the hydraulic pressure from the hydraulic device 69 to the parking lock device 50, which application would be caused by the starting of the engine 26.

4 Claims, 7 Drawing Sheets

CONTROL APPARATUS FOR A VEHICLE

CROSS REFERENCE TO RELATED APPLICATIONS

This application is a National Stage of International Application No. PCT/JP2009/052059 filed Feb. 6, 2009, the contents of all of which are incorporated herein by reference in their entirety.

TECHNICAL FIELD

The present invention relates to a control apparatus for a vehicle, and more particularly to a manner of control of a vehicle having a parking lock device hydraulically placed in a locking state and an unlocking state.

BACKGROUND ART

There is available a vehicular automatic transmission provided with a hydraulic control unit configured to perform a switching operation depending upon a selected shift lever position to effect a shifting operation, according to an electric command signal fed through a wire (electric wire) called a shift by wire (SBW). A rotary motion of such an output shaft of an automatic transmission is inhibited by an actuator of a parking lock device, which is operated on the basis of a command signal generated by a shift lever operation to a parking position (P). Patent Document 1 discloses a technique wherein the actuator of the parking lock device is hydraulically operated.

According to the technique disclosed in Patent Document 1, the parking lock device is brought into its locking state by a biasing force of a spring, to inhibit the rotation of the output shaft, while the parking lock device placed in the locking state is brought into its unlocking state, by a force produced by a hydraulically operated valve, to permit the rotation of the output shaft.

Patent Document 1: JP-2002-533631

DISCLOSURE OF THE INVENTION

Object to be Achieved by the Invention

In the parking lock device configured to be hydraulically placed in the locking and unlocking states, as described above, the valve, a cylinder or any other member of a hydraulic device may fail to normally operate, with a result of sticking (positional locking) of a spool of the valve or a piston in a given position, for example. In such an event, the hydraulic pressure generated by the hydraulic device corresponds to the position in which the member in question is stuck. If the member in question of the hydraulic device operating the parking lock device is stuck in the position for generating the hydraulic pressure to place the parking lock device in the unlocking state, for instance, the hydraulic pressure generated by the hydraulic device is kept at a level for placing the parking lock device in the unlocking state.

In a vehicle, a hydraulic pressure is generally generated by an oil pump driven by a drive power source. While the drive power source is at rest, the oil pump is also at rest, so that the hydraulic pressure is not generated by the oil pump. In the parking lock device which is placed in the locking state not by the hydraulic pressure but by the biasing force of the spring, and in the unlocking state by the hydraulic pressure, according to the technique as disclosed in Patent Document 1, therefore, the parking lock device can be placed into the locking state by the biasing force of the spring when the hydraulic pressure is not available with the drive power source being at rest, even while the member in question of the hydraulic device is stuck in the position for generating the hydraulic pressure to place the parking lock device in the unlocking state.

Although the parking lock device is placed in the locking state while the drive power source is at rest, however, there is a risk that the parking lock device is placed into the unlocking state when the drive power source is started again.

The present invention was made in view of the background art described above. It is therefore an object of the present invention to provide a control apparatus for a vehicle wherein a parking lock device is placed in a unlocking state by a hydraulic pressure generated by an oil pump driven by a drive power source, which control apparatus is configured to reduce the risk of the parking lock device being placed into the unlocking state while a member of the hydraulic device to generate the hydraulic pressure fails to normally operate.

Means for Achieving the Object

The object indicated above is achieved according to the first aspect of the present invention, which provides a control apparatus for a vehicle (a) having a drive power source, a power transmitting device for transmitting a drive force generated by the above-described drive power source to drive wheels, and a parking lock device for locking an output shaft of the above-described power transmitting device when the above-described power transmitting device is placed in a power disconnecting state, (b) the above-described parking lock device being placed in a released state with a hydraulic pressure generated by an oil pump operated by the drive power source, the control apparatus being characterized by comprising (c) drive-power-source start restricting means for restricting starting of the above-described drive power source when a component of a hydraulic device provided to operate the above-described parking lock device has an operating failure that causes the above-described parking lock device to be held in the released state, as compared with the starting when the component does not have the above-described operating failure.

According to the third aspect of the invention, there is provided a control apparatus for a vehicle (a) having a drive power source, a power transmitting device for transmitting a drive force generated by said drive power source to drive wheels, and a parking lock device for locking an output shaft of said power transmitting device when said power transmitting device is placed in a power disconnecting state, (b) the above-described parking lock device being placed in a released state with a hydraulic pressure generated by an oil pump operated by the drive power source, the control apparatus being characterized by comprising: (c) drive-power-source stop restricting means for restricting stopping of said drive power source when a component of a hydraulic device provided to operate said parking lock device has an operating failure that causes said parking lock device to be held in the released state.

Advantages of the Invention

According to the first aspect of the invention, the above-described drive-power-source start restricting means restricts starting of the above-described drive power source when a component of the hydraulic device provided to operate the above-described parking lock device has an operating failure that causes the parking lock device to be held in the released state, as compared with the starting when the component does not have the above-described operating failure, so that the drive-power-source start restricting means reduces a risk of releasing of the above-described parking lock device due to application of the hydraulic pressure from the above-described hydraulic device to the above-described parking lock device, which application would be caused by the starting of the above-described drive power source.

In one preferred form of the invention described above, the above-described drive-power-source start restricting means inhibits the starting of the above-described drive power source when braking means provided to apply a brake to the vehicle is not operated to apply the brake to the vehicle. In this preferred form of the invention wherein the starting of the above-described drive power source is inhibited when the braking means is not operated to apply the brake to the vehicle, there is a reduced risk of insufficiency of the vehicle braking force due to releasing of the above-described parking lock device which would be caused by the starting of the above-described drive power source.

According to the third aspect of the invention, the above-described drive-power-source stop restricting means restricts stopping of the above-described drive power source when a component of the hydraulic device provided to operate the above-described parking lock device has an operating failure that causes the parking lock device to be held in the released state, so that the drive-power-source stop restricting means reduces a risk of releasing of the above-described parking lock device due to application of the hydraulic pressure from the above-described hydraulic device to the above-described parking lock device in accordance with starting of the drive power source, which application would be caused by the re-starting of the above-described drive power source after the drive power source is stopped.

In one preferred form of the former aspect of the invention described above, the above-described drive-power-source stop restricting means inhibits the stopping of the above-described drive power source when braking means provided to apply a brake to the vehicle is not operated to apply the brake to the vehicle. In this preferred form of the invention wherein the stopping of the above-described drive power source is inhibited when the braking means is not operated to apply the brake to the vehicle, there is a reduced risk of insufficiency of the vehicle braking force due to releasing of the above-described parking lock device which would be caused by the re-starting of the above-described drive power source after the above-described drive power source is stopped.

EXPLANATION OF REFERENCE SIGNS

10: Automatic transmission (Power transmitting device)
24: Output shaft of power transmitting device
26: Engine (Drive power source)
50: Parking lock device
52: Parking brake (Braking means)
58: Oil pump
64: Drive wheels
90: Engine stop restricting means (Drive-power-source stop restricting means)
92: Engine start restricting means (Drive-power-source start restricting means)
100: Electronic control device (Control apparatus for a vehicle)

BEST MODE FOR CARRYING OUT THE INVENTION

One embodiment of this invention will be described in detail by reference to the drawings.

Embodiment 1

Figure 1:
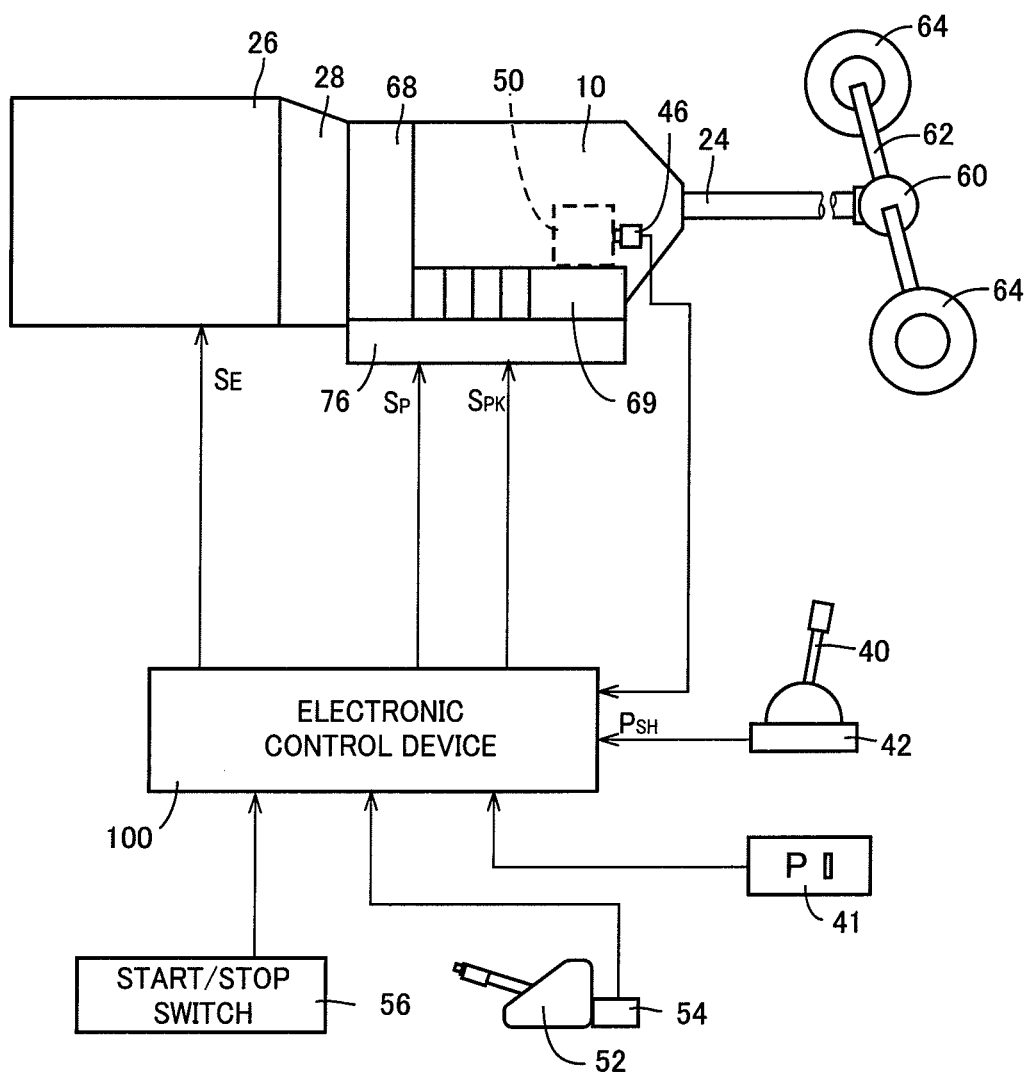
FIG. 1 is a schematic view of a power transmitting system of a vehicle suitably controlled according to the present invention.
Figure 2:
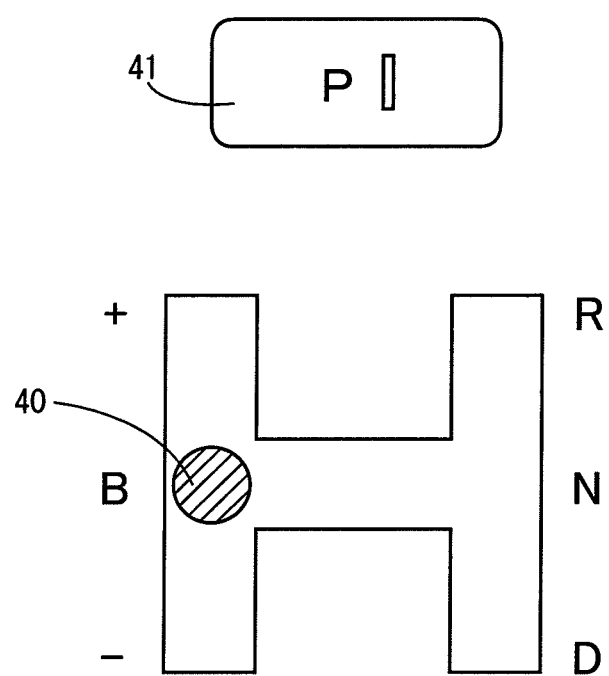
FIG. 2 is a view for explaining operating positions of a shift lever and a parking switch shown in FIG. 1.

FIG. 1 is a block diagram for explaining one example of a construction of a vehicle controlled according to the present invention, illustrating major portions of a control system according to the invention. As shown in FIG. 1, a drive force produced by a drive power source in the form of an engine 26 is transmitted to an input shaft 22 of an automatic transmission 10 through a torque converter 28, for example. The automatic transmission 10 which is a power transmitting device is constructed to transmit a rotary motion of the input shaft 22 to an output shaft 24 with a speed change. In the present embodiment, the input shaft 22 is a turbine shaft of the torque converter 28, for example. A rotary motion of the output shaft 24 is transmitted to drive left and right drive wheels 64 through a differential gear device (final speed reducing device) 60 and a pair of axles 62, for example.

An electronic control device 100 includes a so-called "microcomputer" incorporating a CPU, a RAM, a ROM and an input and output interface. The CPU performs signal processing operations according to control programs stored in the ROM while utilizing a temporary data storage function of the RAM, to control an output of the engine 26 and a shifting operation of the automatic transmission 10. The CPU consists of independent control sections such as an engine control section, and a shifting control section configured to control linear solenoid valves for operating hydraulically operated frictional coupling devices (not shown) in the automatic transmission 10.

As indicated in FIG. 1, the electronic control device 100 receives signals from sensors and switches (not shown), for instance, an output signal of a crank position sensor indicative of a crank position, such as a crank angle (angular position) ACR(°) and an operating speed $N_E$ of the engine 26, an output signal of a turbine speed sensor indicative of a rotating speed $N_T$ of the turbine shaft of the torque converter 28 (namely, a rotating speed $N_{IN}$ of the input shaft 22 of the automatic transmission 10), an output signal of an output shaft speed sensor indicative of a rotating speed $N_{OUT}$ of the output shaft 24 corresponding to a running speed V of the vehicle, an output signal of an intake air quantity sensor indicative of an intake air quantity $Q_{AIR}$ of the engine 26, an output signal of a shift position sensor 42 indicative of a selected operating position $P_{SH}$ of a manual shifting device in the form of a shift lever 40, an output signal of a parking position switch 41 provided to select a parking position P, an output signal of an accelerator sensor indicative of an accelerator operating amount $A_{CC}$ of an accelerator pedal, an output signal of a throttle position sensor indicative of an angle $\theta_{TH}$ of opening of an electronic throttle valve, an output signal of a brake switch indicative of an operated state $B_{ON}$ of a normally used braking device in the form of a foot brake device, an output signal of a parking brake switch 54 indicative of an operated state $P_{BON}$ of a parking brake device, an output signal of an AT oil temperature sensor indicative of a temperature $T_{OIL}$ of a working oil within a hydraulic control unit 76, an output signal of an acceleration sensor indicative of an acceleration value (deceleration value) G of the vehicle, and a start/stop switch 56 provided to start and stop the engine.

The electronic control device 100 generates engine output control command signals $S_E$ for output control of the engine 26, such as a drive signal to drive a throttle actuator for opening and closing the electronic throttle valve, a fuel injection signal for controlling an amount of injection of a fuel from a fuel injecting device, and an ignition timing signal for controlling an ignition timing of the engine 26 by an igniter. The electronic control device 100 further generates shifting control command signals $S_P$ for shifting control of the automatic transmission 10, such as a valve command signals for energizing and de-energizing the linear solenoid valves provided within the hydraulic control unit 76 to perform the shifting operation of the automatic transmission 10, and a drive signal for controlling a linear solenoid valve provided to control a line pressure $P_L$. Described in detail, the automatic transmission 10 is a step-variable automatic transmission, for instance, which includes a differential gear device and which has a plurality of gear positions having respective different speed ratios, which are selectively established by respective combinations of engaged and released states of the hydraulically operated frictional coupling devices in the form of clutches and brakes connected to respective rotary elements of the differential gear device and other members of the automatic transmission 10. The plurality of those hydraulically operated frictional coupling devices are selectively engaged and released by hydraulic pressures supplied from the linear solenoid valves within the hydraulic control unit 76.

When the parking position switch 41 is operated to select the parking position P, or when the shift lever 40 is operated to any one of its operating positions to cancel the parking position P, the electronic control device 100 generates a parking lock command signal $S_{PK}$ for operating an ON-OFF switching valve 72 to generate a hydraulic pressure for actuating a parking lock device 50 (described below) to execute a parking lock for inhibiting a rotary motion of the output shaft 24 or to cancel the parking lock.

The shift lever 40 is disposed near an operator's seat, for example, and has three positions, that is, positions R, N and D arranged in a front-rear (longitudinal) direction of the vehicle, and manual positions "+", B and "−" arranged parallel to a line of arrangement of those positions R, N and D, so that the shift lever 40 is movable to a desired one of the positions in an H pattern. In the present embodiment, the parking position switch 41 is provided independently of the shift lever 40, to select the parking position P for executing the parking lock.

The above-indicated position R is a reverse drive position selected to reverse the direction of rotation of the output shaft 24 of the automatic transmission 10, and the position N is a neutral position selected to disconnect a power transmitting path through the automatic transmission 10, while the position D is a forward drive position selected to permit the shifting operation of the automatic transmission 10 within a drive range, to establish one of forward drive gear positions consisting of a first gear position ($1^{st}$) through an eighth gear position ($8^{th}$). The position B is a manual forward drive position in which the shifting operation takes place within different ranges having respective different numbers of the forward drive gear positions are available, with the relatively higher-speed gear position or positions being unavailable. The parking position P selected by operating the parking position switch 41 is a parking lock position in which the automatic transmission 10 is placed in the neutral state for disconnecting the power transmitting path in the automatic transmission 10, and in which the rotary motion of the output shaft 24 is mechanically inhibited by a mechanical parking mechanism.

The shift lever 40 placed in the position B is movable to the position "+" and the position "−", so that the number of the forward drive gear positions available is increased each time the shift lever 40 is moved to the position "+", and is reduced each time the shift lever 40 is moved to the position "−". When the shift lever 40 is moved to the position "+" or "−", the automatic transmission 10 is shifted from the presently selected forward drive gear position to another, for example.

The position D is considered to be a position for selecting an automatic shifting mode in which the automatic transmission 10 is automatically shiftable to any one of the forward drive gear positions available, while the position B is considered to be a position for selecting a manual shifting mode in which the automatic transmission 10 is automatically shiftable to one of the forward drive gear positions the number of which is smaller than in the automatic shifting mode, and from which the shift lever 40 is manually movable to change the number of the forward drive gear positions available (to change the highest-speed forward drive gear position).

Referring back to FIG. 1, the parking lock device 50 is operated to inhibit the rotary motion of the output shaft 24 of the automatic transmission 10 when the parking position switch 41 is operated to select the parking position P, as described below in detail.

A parking brake lever 52 is provided to operate and release the parking brake device (not shown), and is connected to the parking brake device through a cable (not shown). When the parking brake lever 52 is pivoted upwards, for instance, the parking brake device is operated to apply a parking brake to the vehicle, and this operation of the parking brake lever 52 is detected by a parking brake switch 54, so that a signal indicating the operation of the parking brake device is fed to the electronic control device 100. The parking brake lever 52 has, for example, a ratchet mechanism, which can hold the parking brake lever 52 in its pivoted state, i.e. the parking brake device in its operated state and permits it to be returned to its released state.

A start/stop switch 56 is a so-called "ignition switch", for example, which is operated by the vehicle operator to supply the electronic control device 100 with a signal to start and stop the drive power source in the form of the engine 26.

Figure 3:
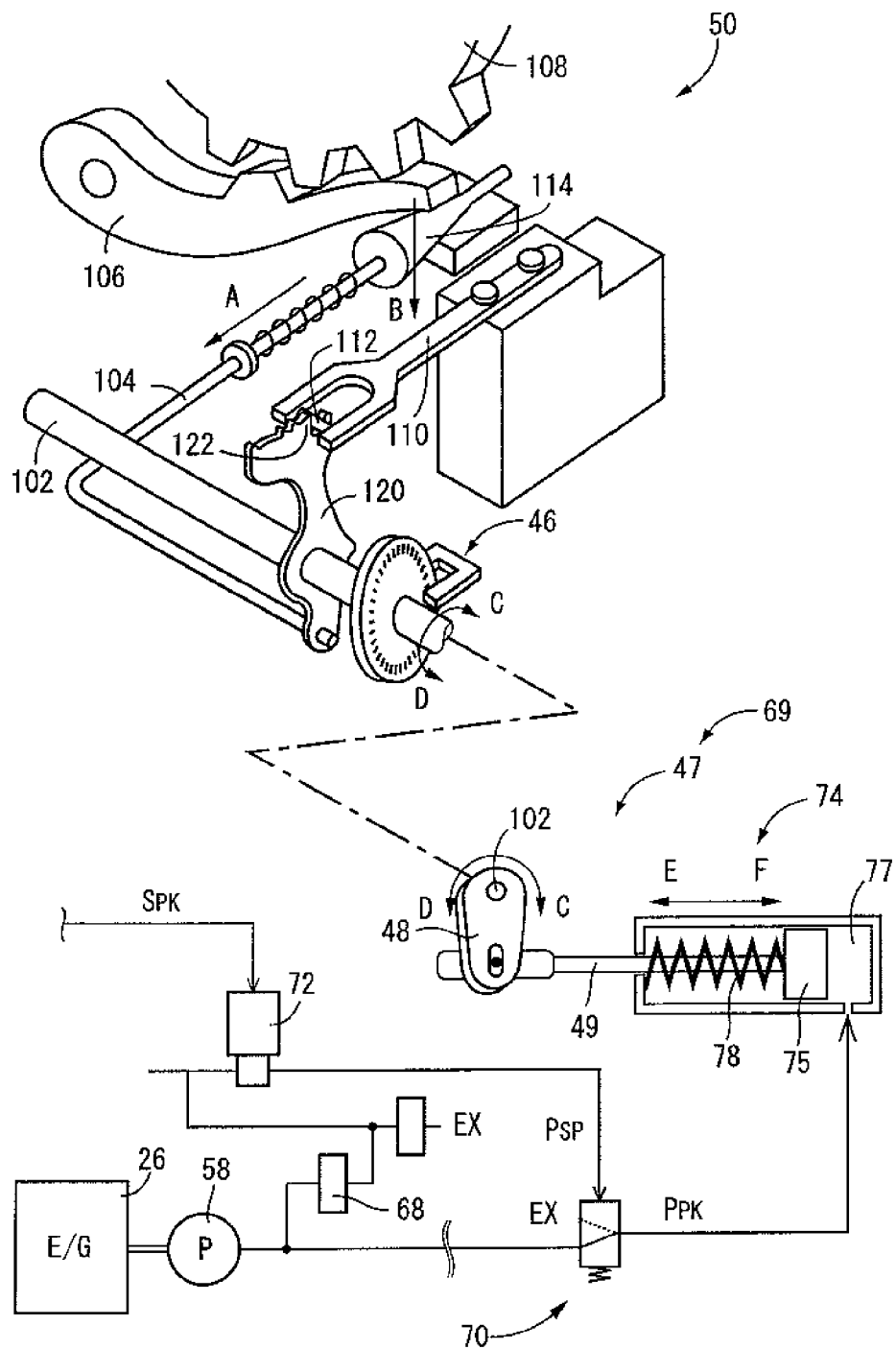
FIG. 3 is a schematic view for explaining a parking lock device of FIG. 1 and a hydraulic device for operating the parking lock device.

FIG. 3 is a view for explaining a construction of the parking lock device 50 for executing the parking lock when the parking position switch 41 is operated to select the parking position P, and an arrangement of a hydraulic device for operating the parking lock device 50.

The parking lock device 50 has: a shaft 102 rotated by a pivotal member 48 as described below; a detent plate 120 fixed to and pivoted by the shaft 102; a rod 104 movable in its longitudinal direction by a pivotal motion of the detent plate 120; a parking gear 108 fixed to the output shaft 24 of the automatic transmission 10; a parking lock pawl 106 pivotably connected to a casing (not shown) to lock the parking gear 108; a detent spring 110 provided to hold, with its biasing force, the detent plate 120 in a selected one of angular positions described below; and a rotatable pin 112 supported at a distal end portion of the detent spring 110.

The detent plate 120 is operatively connected through the shaft 102 to the pivotal member 48 of a crank mechanism 47 described below, and cooperates with the rod 104, detent spring 110, rotatable pin 112 and other members to function as a shift positioning member operated by the crank mechanism 47 to change the shift position of the transmission. The shaft 102, detent plate 120, rod 104, detent spring 110 and rotatable pin 112 cooperate with each other to function as a shift position changing mechanism.

Figure 5:
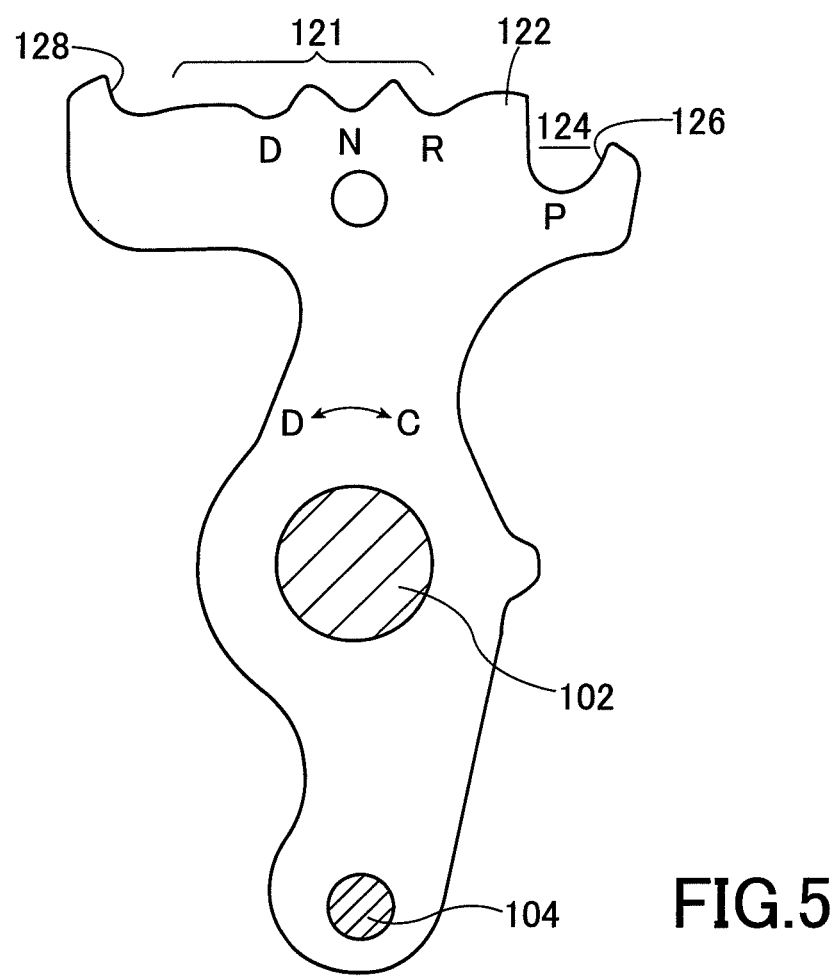
FIG. 5 is a view for explaining a construction of a detent plate shown in FIG. 4.

As shown in FIG. 5, the detent plate 120 has four recesses formed in its upper end portion, between a pair of inner wall surfaces 126, 128. These four recesses correspond to the respective shift positions P, R, N and D. The four recesses include an outer recess 124 corresponding to the position P. Those shift positions P, R, N and D of the detent plate 120 correspond to the respective shift positions P, R, N and D selected by the shift lever 40 and the parking position switch 41. The shift positions R, N and D are called non-P positions.

Referring back to FIG. 3, the parking lock device 50 shown therein is placed in a state in which the shift position P is selected. In this state, the parking lock pawl 106 locks the parking gear 108 to prevent rotary motions of drive shafts of the vehicle. In this embodiment, this state is called the operated state of the parking lock device 50. When the parking lock command signal $P_{SK}$ to return the parking lock device 50 from this operated state to its released state is generated from the electronic control device 100, the crank mechanism 47 is operated to rotate the shaft 102 in a direction indicated by an arrow C shown in FIG. 3, so that the rod 104 is moved by the detent plate 120 in a direction indicated by an arrow A shown in FIG. 3, whereby a tapered member 114 provided at one end of the rod 104 permits the parking lock pawl 106 to be pivoted downwards in a direction indicated by an arrow B shown in FIG. 3. As the detent plate 120 is pivoted, the rotatable pin 112 of the detent spring 110 is moved from the outer recess 124 of the four recesses formed in the upper end portion of the detent plate 120 and corresponding to the respective positions P, R, N and D, namely, from the position P (124) (indicated in FIG. 5 to one of the other recess, namely, to one of the non-P positions 121 (indicated in FIG. 5), while clearing the tooth 122. This rotatable pin 112 is provided on the detent spring 110 such that the rotatable pin 112 is rotatable about its axis. When the rotatable pin 112 has been moved into one of the non-P positions 121 with a pivotal motion of the detent plate 120 in the direction C until rotatable pin 112, the parking lock pawl 106 has been pivoted downwards to a position in which the parking lock pawl 106 does not mesh with the parking gear 108. As a result, the mechanical locking of the output shaft 24 and the vehicle drive wheels 64 is released, and the detent plate 120 is pivoted to the above-indicated non-P position. When the shaft 102 is rotated in a direction D by a crank mechanism 47, the detent plate 120 is pivoted to the shift position P with reversal of the motions described above.

A rotary encoder 46 generates a pulse signal for counting the number (encoder counts) indicative of an amount of operation of the crank mechanism 47, that is, an amount of the pivotal motion of the pivotal member 48. The electronic control device 100 determines whether the position P or non-P position is selected, on the basis of the output pulse signal of the rotary encoder 46. The amount of the pivotal motion of the pivotal member 48 corresponds to an amount of rotation of the shaft 102 of the parking lock device 50. The above-described position P is determined by experimentation or simulation, as a position in which the parking gear 108 is securely locked by the parking lock pawl 106. Namely, the rotary encoder 46 functions as a parking lock sensor for detecting whether the parking lock device 50 is placed in its operated or released state.

FIG. 3 also shows a hydraulic circuit showing one example of an arrangement of a hydraulic device 69 for operating the above-described parking lock device 50. This hydraulic circuit is provided by the hydraulic control unit 76 (shown in FIG. 1).

A mechanical oil pump 58 is driven by the engine 26, to generate a hydraulic pressure, which is regulated to a desired line pressure $P_{PK}$ (parking lock releasing line pressure $P_{PK}$), by a pressure regulating valve 68 of a relief type.

An ON-OFF switching valve 72 is a solenoid-operated valve, for instance, and is operated according to the parking lock command signal $S_{PK}$ from the electronic control device 100, to apply a pilot pressure $P_{SP}$ to a switching valve 70 described below. In the present embodiment, the ON-OFF switching valve 72 is configured to generate the pilot pressure $P_{SP}$ when an input control signal in the form of the parking lock command signal $S_{PK}$ is in an on state, and not to generate the pilot pressure $P_{SP}$ when the parking lock command signal $S_{PK}$ is in an off state. It is noted here that the parking lock command signal $S_{PK}$ is turned on when the electronic control device 100 determines that the parking lock device 50 should be placed in the operated state, and is turned off when the electronic control device 100 determines that the parking lock device 50 should be placed in the released state.

The switching valve 70 has an input port, a drain port and an output port. When the switching valve 70 is not supplied with the pilot pressure $P_{SP}$, a spool disposed within the switching valve 70 is held in a position for communication between the input port communicating with the pressure regulating valve 68 and the output port communicating with a hydraulic cylinder 74 described below, under a biasing force of a spring disposed within the switching valve 70, for example. When the switching valve 70 is supplied with the pilot pressure $P_{SP}$, on the other hand, the spool is moved to a position for communication between the above-described output port and the drain port EX communicating with a drain line.

The hydraulic cylinder 74 serving as a hydraulic actuator has an oil chamber 77 receiving a hydraulic pressure from the above-described switching valve 70, a piston 75, and a spring 78 for biasing the piston 75 in a direction opposite to a direction in which the hydraulic pressure in the oil chamber 77 acts on the piston 75. When the hydraulic pressure $P_{PK}$ is supplied from the switching valve 70 to the oil chamber 77, the piston 75 is moved to a position of equilibrium between the above-described hydraulic pressure $P_{PK}$ and a biasing force of the spring 78. The crank mechanism 47 includes a crank rod 49 connected to the piston 75, and functions to convert linear motions of the piston 75 input thereto via the crank rod 49, that is, motions of the piston 75 in directions E and F indicated in FIG. 3, into pivotal motions of the pivotal member 48, that is, motions of the pivotal member 48 in the directions C and D indicated in FIG. 3. The pivotal member 48 and the shaft 102 of the parking lock device 50 are fixed to each other such that the pivotal member 48 is pivoted about the axis of the shaft 102.

The hydraulic device 69 and the parking lock device 50 are constructed as described above. To place this parking lock device 50 in its operated state, the parking lock command signal $S_{PK}$ generated from the electronic control device 100 is initially turned on, to enable the ON-OFF switching valve 72 to generate the pilot pressure $P_{SP}$. As a result, the switching valve 70 is placed in the state for communication between the drain port EX and the output port communicating with the oil chamber 77 of the hydraulic cylinder 74, so that the pressurized oil in the oil chamber 77 of the hydraulic cylinder 74 is discharged from the drain port EX of the switching valve 70, whereby the piston 75 in the hydraulic cylinder 74 is moved in the direction F indicated in FIG. 3, under the biasing force of the spring 78. Consequently, the shaft 102 of the parking lock device 50 is rotated through the crank mechanism 47, in the direction D indicated in FIG. 3. Thus, the detent plate 120 is pivoted to locate the rotatable pin 112 in the position P, so that the parking pawl 106 is pivoted upwards to lock the parking gear 108. Thus, the parking lock device 50 is placed in its operated state in which the output shaft 24 of the automatic transmission 10 is locked.

To place the parking lock device 50 in its released state, the parking lock command signal $S_{PK}$ generated from the electronic control device 100 is turned off, to disable the ON-OFF switching valve 72 to generate the pilot pressure $P_{SP}$. As a result, the switching valve 70 is placed in the state for applying the hydraulic pressure $P_{PK}$ received from the pressure regulating valve 68 to the oil chamber 77 of the hydraulic cylinder 74, so that the piston 75 is moved in the direction E indicated in FIG. 3, by a pressing force which acts on the piston 75 based on the hydraulic pressure $P_{PK}$ in the oil chamber 77, which pressing force is larger than the biasing force of the spring 78. This motion of the piston 75 is converted by the crank mechanism 47 into a rotary motion of the shaft 102 in the direction C indicated in FIG. 3. The detent plate 120 is pivoted so that the rotatable pin 112 located in the position P is moved to one of the non-P positions 121, so that the parking pawl 106 is pivoted downwards in the direction B indicated in FIG. 3, to a position for disengagement from the parking gear 108. Thus, the parking lock device 50 is placed in its released state.

The valves and other components of the hydraulic device may suffer from operating failures or abnormalities such as wire disconnection, short circuiting and spool sticking of the solenoid-operated valves, which may cause a failure to apply the hydraulic pressure to the desired locations.

Described in detail, such operating failures include, for example, sticking of the spool of the ON-OFF switching valve 72, which disables this valve 72 to generate the pilot pressure $P_{SP}$ irrespective of the on or off state of the parking lock command signal $S_{PK}$, and a failure of the switching valve 70, which causes permanent communication of its output port with the input port communication with the pressure regulating valve 68, even when the pilot pressure $P_{SP}$ is applied to the switching valve 70. These operating failures cause the hydraulic pressure regulated by the pressure regulating valve 68 to be applied to the oil chamber 77 of the hydraulic cylinder 74, irrespective of the on or off state of the parking lock command signal $S_{PK}$, so that the parking lock device 50 is kept in its released state.

In the present embodiment wherein the oil pump 58 is driven by the drive power source, the oil pump 58 fails to generate a hydraulic pressure while the drive power source in the form of the engine 26 is held at rest. Consequently, the parking lock releasing line pressure $P_{PK}$ is not applied to the oil chamber 77 of the hydraulic cylinder 74, and the oil is discharged from the oil chamber 77, irrespective of whether the switching valve 70 is placed in the state for communication of its drain port EX with the oil chamber 77, or in the state for communication between the pressure regulating valve 60 and the oil chamber 77 during the engine 26 at rest. Namely, the parking lock device 50 is placed in its operated state when the engine 26 is at rest.

In the arrangement described above, the parking lock device 50 which has been placed in the operated state while the engine 26 is at rest may be placed in the released state when the engine 26 is started again, if the oil chamber 77 of the hydraulic cylinder 74 is held in communication with the pressure regulating valve 68 due to the operating failure of the ON-OFF switching valve 72 or the switching valve 70 described above, for example.

Figure 4:
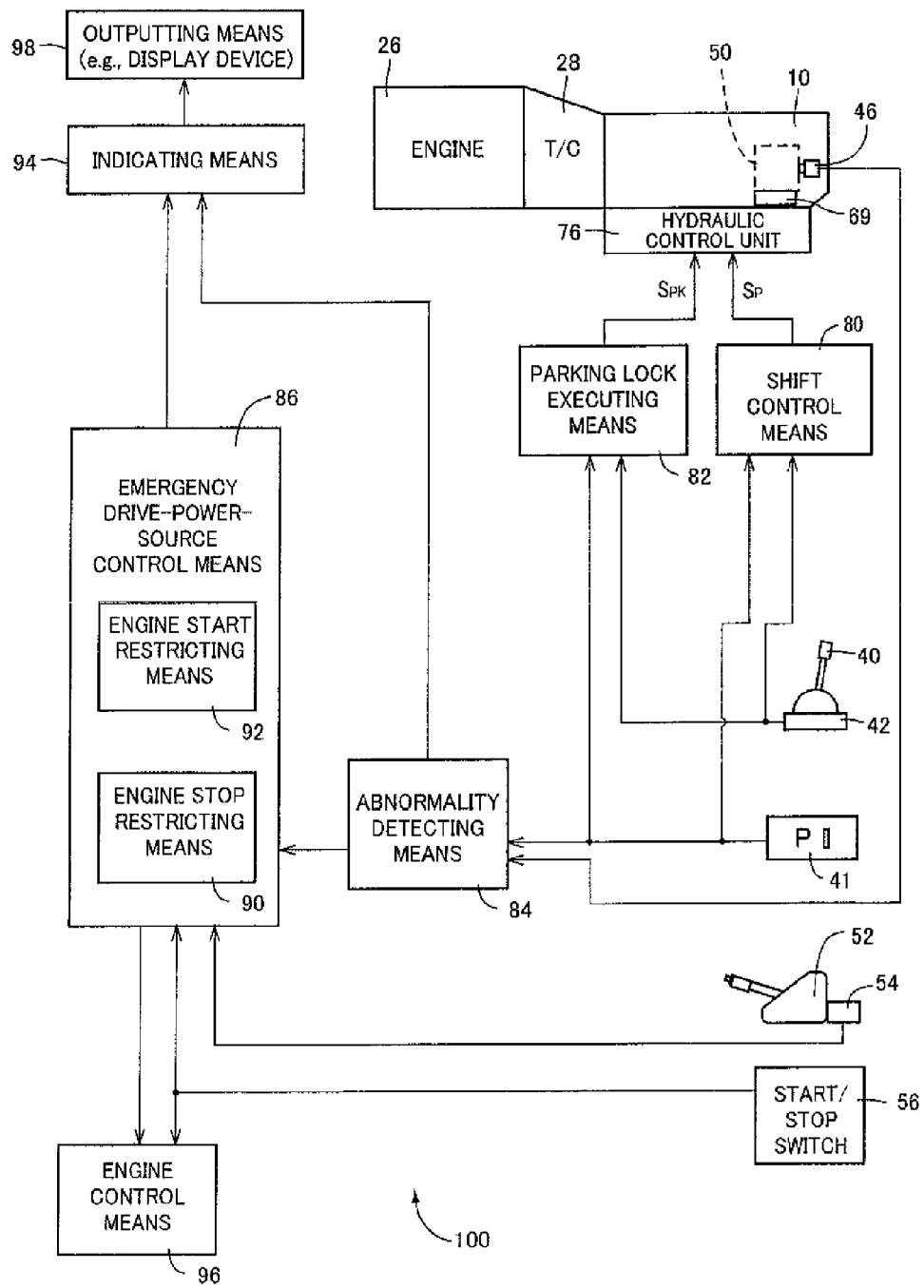
FIG. 4 is a functional block diagram for explaining major control functions of an electronic control device of FIG. 1

FIG. 4 is the functional block diagram for explaining major control functions of the above-described electronic control device 100, that is, the major control functions performed when the engine 26 is stopped and started, if the oil chamber 77 of the hydraulic cylinder 74 is held in communication with the pressure regulating valve 68 due to an operating failure of any component of the hydraulic device 69 provided to operate the parking lock device 50.

Shift control means 80 is provided and configured to determine the gear position of the automatic transmission 10 to be established, on the basis of control parameters including: the presently selected operating position $P_{SH}$ of the shift lever 40 detected by the shift position sensor 42; the output signal of the parking position switch 41 indicating whether the parking position P is selected; the vehicle speed V; and the operating amount $A_{CC}$ of the accelerator pedal, and according to a shifting map stored in memory. The shift control means 80 is further configured to controlling the solenoid-operated valves incorporated in the hydraulic control unit 76, to generate the hydraulic pressures required to establish the selected gear position of the automatic transmission 10.

Parking lock executing means 82 is provided and configured to place the parking lock device 50 in its operated state, according to the output signal of the parking position switch 41 indicative of the selection of the parking position P, and to place the parking lock device 50 in its released state, according to the output signal of the shift position sensor 42 indicative of the selecting of any one of the above-indicated positions R, N and D other than the parking position P. Described in detail, the parking lock device 50 is configured to generate the parking lock command signal $S_{PK}$ for operating the ON-OFF switching valve 72 incorporated in the hydraulic control unit 76, to control the hydraulic device 69 for selectively placing the parking lock device 50 in the operated or released state.

Abnormality detecting means 84 is provided and configured to detect an abnormality of the hydraulic device 69, more specifically, a failure of the hydraulic device 69 to place the parking lock device 50 in its operated state, in spite of generation of a command signal from the parking lock executing means 82 to execute the parking lock. In the present embodiment, this failure is caused by an operating failure of the ON-OFF switching valve 72 or switching valve 70 as a component of the hydraulic device 69, which operating failure causes the communication of the oil chamber 77 of the hydraulic cylinder 74 with the pressure regulating valve 68.

Described in detail, the abnormality detecting means 84 determines whether the parking lock device 50 cannot be placed in the operated state, in spite of generation of the command signal from the parking lock executing means 82 to execute the parking lock. This determination is made on the basis of the output signal of the parking position switch 41 indicative of the selection of the above-described parking position P, and the output signal of the rotary encoder 46 indicative of the amount of rotation of the above-described shaft 102 of the parking lock device 50. That is, the abnormality detecting means 84 detects this abnormality if a determination that the parking lock device 50 has been placed in the operated state is not obtained on the basis of the output signal of the above-described rotary encoder 46, within a predetermined length of time after the output signal of the parking position switch 41 indicative of the selection of the above-described parking position P is generated. For example, the determination that the parking lock device 50 is placed in the operated state can be obtained when the output signal of the rotary encoder 46 indicates that the shaft 102 has been rotated by an amount required to pivot the detent plate 120 to locate the rotatable pin 112 in the position P (124). The above-indicated predetermined length of time may be determined to be a sum of an average time from a moment of generation of the output signal of the parking position switch 41 indicative of the selection of the parking position P to a moment at which the parking lock device 50 is placed in the operated state, in the absence of the above-indicated abnormality, and a predetermined additional time. The average time is obtained by experimentation or simulation.

If the abnormality detecting means 84 detects the above-indicated abnormality, the abnormality detecting means 84 turns on a parking-switching-valve abnormality diagnosis flag indicating that the abnormality has occurred. On the basis of this diagnosis flag set in the on state, emergency drive-power-source control means 86 described below recognizes that the abnormality in question has occurred. The abnormality detecting means 84 is also configured to command indicating means 94 described below to inform the vehicle operator of the fact that the abnormality has occurred when the abnormality is detected. For instance, the indicating means 94 informs the vehicle operator of a possibility of the operating failure of the parking lock device 50, or prompts the vehicle operator to operate the parking brake lever 52 before operating the start/stop switch 56 to stop the engine 26.

Engine control means 96 is provided and configured to start and stop the engine 26 on the basis of respective command signals generated by the start/stop switch 56 for starting and stopping the engine 26. Described in detail, the engine control means 96 starts the engine 26 by a starter motor not shown, when the command signal for starting the engine 26 is generated by the start/stop switch 56, and stops the engine 26 by stopping ignition of the engine 26, for example, when the command signal for stopping the engine 26 is generated by the start/stop switch 56.

Emergency drive-power-source control means 86 is provided and configured to execute stopping and starting controls of the drive power source upon detection of an abnormality by the abnormality detecting means 84, which controls are different from those executed without detection of the abnormality. The emergency drive-power-source control means 86 includes engine stop restricting means 90 and engine start restricting means 92.

The engine stop restricting means 90 is configured to command the engine control means 96 to execute the following controls of the engine 26 when the command signal to stop the engine 26 is generated by the start/stop switch 56 and before the operation of controlling the engine 26 to stop by the engine control means 96, while an abnormality is detected by the abnormality detecting means 84. Namely, the engine stop restricting means 90 commands the engine control means 96 to stop the engine 26 if the parking brake switch 54 detects that the parking brake lever 52 for operating braking means in the form of the parking brake device is placed in its operated position, and to inhibit the stopping of the engine 26 if the parking brake switch 54 does not detect that the parking brake lever 52 is placed in its operated position. This engine stop restricting means 90 corresponds to drive-power-source stop restricting means.

The engine start restricting means 92 is configured to command the engine control means 96 to execute the following controls of the engine 26 when the command signal to start the engine 26 is generated by the start/stop switch 56 and before the operation of controlling the engine 26 to start by the engine control means 96, while an abnormality is detected by the abnormality detecting means 84. Namely, the engine start restricting means 92 commands the engine control means 96 to start the engine 26 if the parking brake switch 54 detects that the parking brake lever 52 for operating braking means in the form of the parking brake device is placed in its operated position, and to inhibit the starting of the engine 26 and command the indicating means 94 to provide the vehicle operator with suitable information as described below, if the parking brake switch 54 does not detect that the parking brake lever 52 is placed in its operated position. For example, the indicating means 94 provides information prompting the vehicle operator to operate the parking brake lever 52 before starting the engine 26. This engine start restricting means 90 corresponds to drive-power-source start restricting means.

The indicating means 94 is configured to command outputting means 98 such as a display device or a voice generating device to provide the vehicle operator with suitable information, according to the commands generated by the abnormality detecting means 84 and engine start restricting means 92 described above. Described in detail, the outputting means 98 provides an indication that there is a possibility of occurrence of any abnormality of the parking lock device 50, or information prompting the vehicle operator to operate the parking brake lever 52 before operating the start/stop switch 56 before stopping the engine 26, if an abnormality is detected by the abnormality detecting means 84, and provides information prompting the vehicle operator to operate the parking brake lever 52 before starting the engine 26, if the starting of the engine 26 is inhibited by the above-described engine start restricting means 92.

Figure 6:
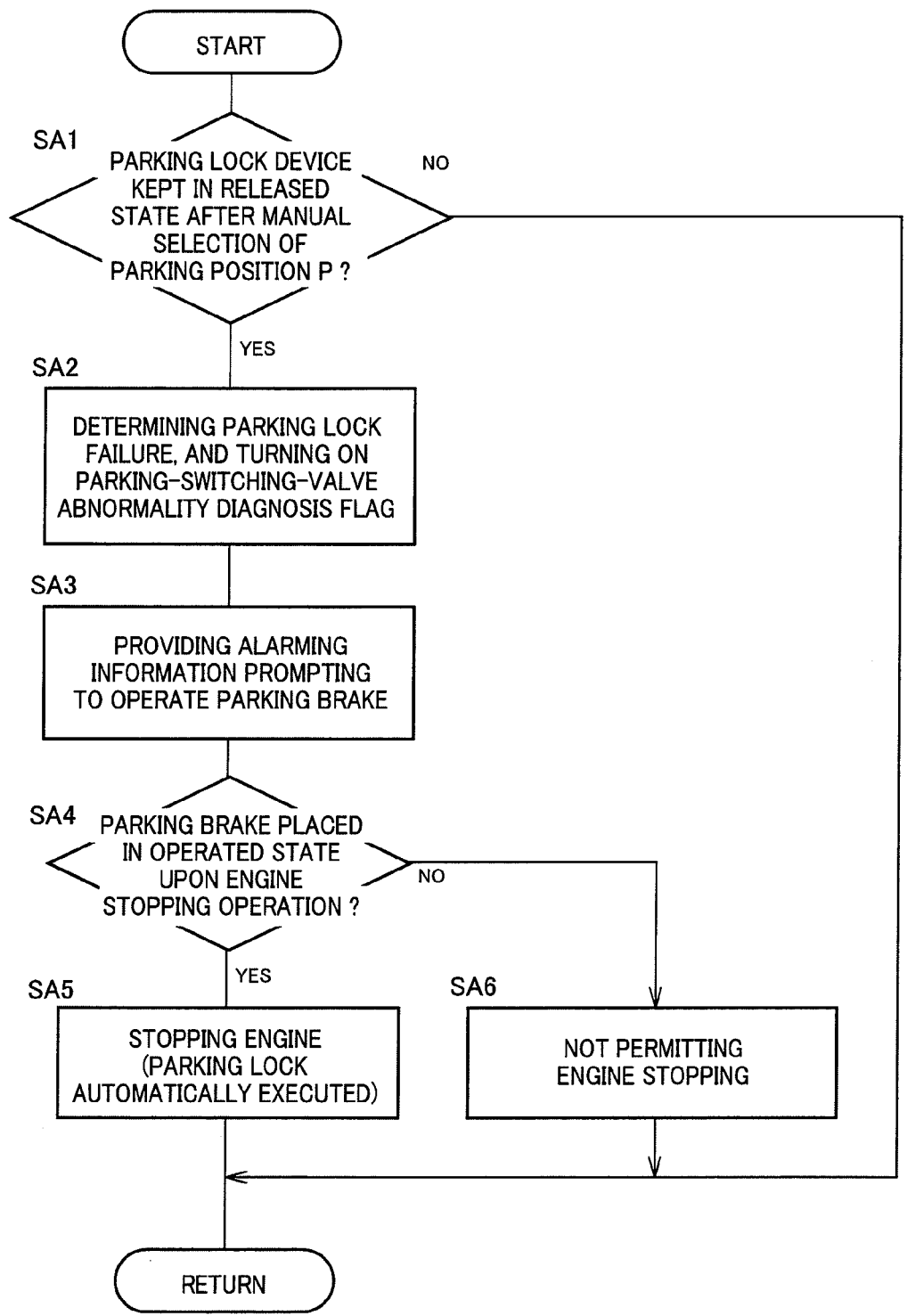
FIG. 6 is a flow chart schematically illustrating a control operation of the electronic control device of FIG. 4 performed when an engine stop command signal is generated.

FIG. 6 is a flow chart for explaining major control functions of the above-described electronic control device 100, more specifically, control functions to be performed when the command signal for stopping the engine 26 is generated by the start/stop switch 56 during an operation of the engine 26.

SA1 and SA2 are steps corresponding to the abnormality detecting means 84. SA1 is implemented to determine whether the parking lock device 50 is not placed in the operated state, that is, the parking lock is not executed, within the above-described predetermined length of time after the parking position P has been selected by the parking position switch 41. For example, this determination is made on the basis of the output of the rotary encoder 46. If the parking lock device 50 is not placed in the operated state within the above-described predetermined length of time, an affirmative determination is obtained in the present step, and SA2 is then implemented. If the parking lock device 50 is placed in the operated state within the above-described predetermined length of time, on the other hand, it is determined that the hydraulic device 69 is normal, so that a negative determination is obtained in the present step, whereby the present cycle of operation of the flow chart is terminated.

SA2 is the step implemented if the affirmative determination is obtained in SA1, that is, if the parking lock device 50 is not placed in the operated state within the above-described predetermined length of time. In this case, it is determined that any component of the hydraulic device 69 for operating the parking lock device 50 may fail to normally operate to execute the parking lock, so that the parking-switching-valve abnormality diagnosis flag is turned on.

SA3 corresponding to the indicating means 94 etc. is implemented to command the outputting means 98 to inform the vehicle operator that there is a possibility of occurrence of an abnormality of the parking lock device 50, or to provide information prompting to operate the parking brake lever 52 before operating the start/stop switch 56 to stop the engine 26.

SA4 is a step corresponding to the engine stop restricting means 90 etc. SA4 is implemented to determine on the basis of the output of the parking position switch 54, whether the parking brake lever 52 is placed in the operated position, when the command signal to stop the engine 26 is generated by the start/stop switch 56 during the engine 26 running. If the parking brake lever 52 is placed in the operated state when the command signal to stop the engine 26 is generated, an affirmative determination is obtained in SA4, and SA5 is then implemented. If it is determined on the basis of the output of the parking position switch 54 that the parking braking brake lever 52 is placed in the released state when the command signal to stop the engine 26 is generated, a negative determination is obtained in this step, and SA6 is then implemented.

SA5 corresponding to the engine control means 96 is implemented to stop the engine 26 which has been operating. Described in detail, the engine control means 96 stops the engine 26 by stopping the ignition by ignition plugs not shown, or stopping the supply of a fuel by a fuel supply valve not shown, for example. It is noted that the present embodiment is configured such that the oil pump 58 is not operated to generate the hydraulic pressure when the engine 26 is at rest, so that the parking lock device 50 is brought into its operated state by the biasing force of the spring 78, as described above.

SA6 implemented when the negative determination is obtained in SA4 corresponds to the engine stop restricting means 90. In SA6, the stopping of the engine 26 is inhibited in spite of generation of the command signal to stop the engine 26 in SA4.

Figure 7:
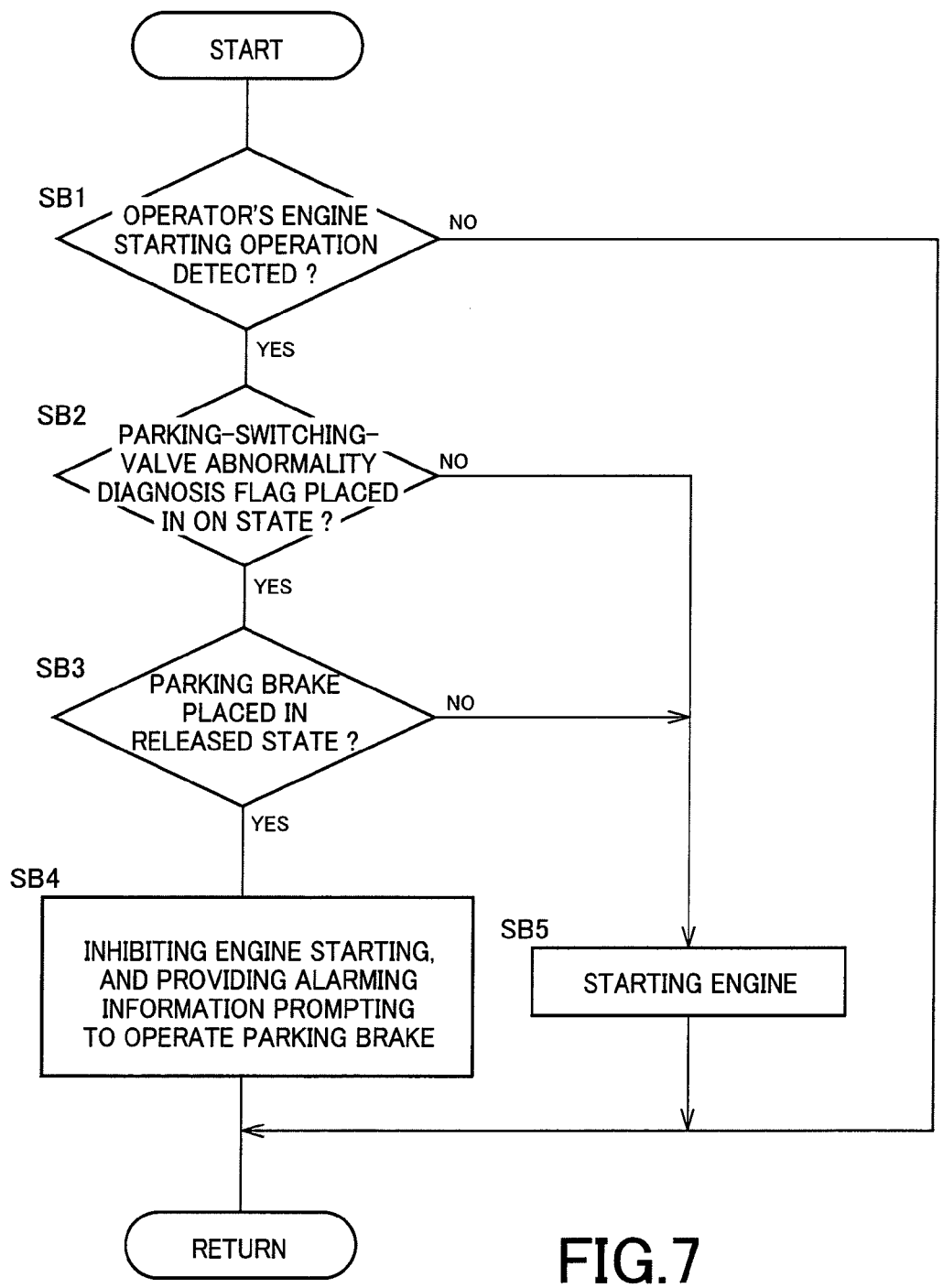
FIG. 7 is a flow chart schematically illustrating a control operation of the electronic control device of FIG. 4 performed when an engine start command signal is generated.

FIG. 7 is a flow chart for explaining other major control functions of the above-described electronic control device 100, more specifically, control functions to be performed when the command signal for starting the engine 26 is generated by the start/stop switch 56 while the engine 26 is at rest.

Initially, SB1 is implemented to determine whether the command signal by the start/stop switch 56 to start the engine 26 has been detected during the engine 26 stopping. If the command signal to start the engine 26 has been detected, an affirmative determination is obtained in this step, and SB2 is then implemented. If the command signal to start the engine 26 has not been detected, on the other hand, a negative determination is obtain in the present step, and the present of operation of the flow chart is terminated.

The following SB2-SB4 correspond to the engine starting restricting means 92. SB2 is implemented to determine whether the parking-switching-valve abnormality diagnosis flag is placed in the on state. This parking-switching-valve abnormality diagnosis flag is turned on in SA2 of the flow chart of FIG. 6, for example, during the operation of the engine 26 before the engine 26 is stopped. If the parking-switching-valve abnormality diagnosis flag is placed in the on state, an affirmative determination is obtained in SB2, and SB3 is then implemented. If the parking-switching-valve abnormality diagnosis flag is not placed in the on state, a negative determination is obtained in SB2, and SB5 is then implemented.

SB3 is implemented to determine whether the parking brake lever 52 is placed in the released state. For example, this determination is made on the basis of the output of the parking position switch 54. If the parking brake lever 52 is placed in the released state, an affirmative determination is obtained in the present step, and SB4 is then implemented. If the parking brake lever 52 is placed in the operated state, on the other hand, SB5 is implemented.

SB4 is a step implemented when an affirmative determination is obtained in SB3, that is, when the parking brake lever 52 is placed in the released state while the parking-switching-valve abnormality diagnosis flag is placed in the on state. In this step, the starting of the engine 26 is inhibited, in spite of detection in SB1 of the command signal to start the engine 26. Described in detail, a cranking operation to start the engine 26 is inhibited, for example. The present step SB4 also corresponding to the indicating means 94 is implemented to command the outputting means 98 such as an optical display device or a voice generating device to provide information prompting to operate the parking brake lever 52 for starting the engine 26.

On the other hand, SB5 is a step which corresponds to the engine control means 96 and which is implemented if a negative determination is obtained in SB2 or SB3, that is, when the parking-switching-valve abnormality diagnosis flag is placed in the off state, or when the parking brake lever 52 is placed in the operated state while the parking-switching-valve abnormality diagnosis flag is placed in the on state. In this step, the engine 26 is started on the basis of the command signal to start the engine 26, which has been detected in SB1.

In the embodiment described above, the engine start restricting means 92 restricts starting of the engine 26 when the ON-OFF switching valve 72, switching valve 70 or any other component of the hydraulic device 69 provided to operate the parking lock device 50 has an operating failure that causes the parking lock device 50 to be held in the released state, as compared with the starting when the component does not have the operating failure, so that the engine start restricting means 92 reduces a risk of releasing of the parking lock device 50 due to application of the hydraulic pressure from the hydraulic device 69 to the parking lock device 50, which application would be caused by the starting of the engine 26.

The above-described embodiment is further arranged such that the engine start restricting means 92 inhibits the starting of the engine 26 when the parking brake lever 52 for operating the parking brake device is not operated. Since the starting of the engine 26 is inhibited when the parking brake device is not operated to apply the brake to the vehicle, there is a reduced risk of insufficiency of the vehicle braking force due to releasing of the parking lock device 50 which would be caused by the starting of the engine 26.

The above-described embodiment is also arranged such that the engine stop restricting means 90 restricts stopping of the engine 26 when the ON-OFF switching valve 72, switching valve 70 or any other component of the hydraulic device 92 provided to operate the parking lock device 50 has an operating failure that causes the parking lock device 50 to be held in the released state, so that the engine stop restricting means 90 reduces a risk of releasing of the parking lock device 50 due to application of the hydraulic pressure from the hydraulic device 69 to the parking lock device 50 in accordance with starting of the engine 26, which application would be caused by the re-starting of the engine 26 after the engine 26 is stopped.

The above-described embodiment is further arranged such that the engine stop restricting means 90 inhibits the stopping of the engine 26 when the parking brake lever 52 for operating the parking brake device is not operated. Since the stopping of the engine 26 is inhibited when the parking brake is not operated to apply the brake to the vehicle, there is a reduced risk of insufficiency of the vehicle braking force due to releasing of the parking lock device 52 in accordance with starting of the engine 26 which would be caused by the re-starting of the engine 26 after the engine 26 is stopped.

While the preferred embodiment of this invention has been described in detail by reference to the drawings, it is to be understood that the invention may be otherwise embodied.

For example, the above-described embodiment uses the step-variable automatic transmission 10 as the power transmitting device. However, the use of the step-variable automatic transmission 10 is not essential. For instance, the automatic transmission 10 may be replaced by a continuously-variable automatic transmission the speed ratio of which is continuously variable over a predetermined range.

The above-described embodiment is arranged such that the shift lever 40 to select the gear positions other than the parking position, and the parking position switch 41 to select the parking position are provided as devices operated by the vehicle operator to select the shift positions. However, this arrangement is not essential. Namely, the shift lever 40 may be modified to select all shift positions including the parking position.

The above-described embodiment is further arranged such that the parking lock hydraulic pressure $P_{PK}$ is kept applied to the oil chamber 77 of the hydraulic cylinder 74 in the hydraulic device 69, for biasing the rod 102 of the parking lock device 50 in a direction to hold the parking lock device 50 in its released state. However, this arrangement is not essential. For example, the piston 76 of the hydraulic cylinder 74, or the crank rod 49 of the crank mechanism 47 is locked with a ratchet mechanism or a magnet, for instance, after the parking lock device 50 is once placed in its released state, and the locking of the piston 76 or crank rod 49 is released when the parking lock device 50 is again placed into its operated state. In this case, the hydraulic device 69 need not be kept operated to generate the hydraulic pressure for holding the parking lock device 50 in the released state.

Although the above-described embodiment uses the hydraulic cylinder 74 as the hydraulic actuator, any other type of hydraulic actuator such as a hydraulic motor or a diaphragm type hydraulic actuator may be used.

In the above-described embodiment, the parking brake device operated by the parking brake lever 52 is used to apply a parking brake to the vehicle. However, any other parking brake device may be used, provided the parking brake device is capable of applying a parking brake to the vehicle, irrespective of the operating state of the drive power source of the vehicle, that is, irrespective of whether the drive power source is in operation or at rest.

The sticking of the spools of the ON-OFF switching valve 72 and switching valve 70 is described as examples of the operating failure or abnormality of the hydraulic device 69, with respect to the above-described embodiment. However, the operating failure of the hydraulic device 69 includes any other failure such as the sticking of the piston 77 of the hydraulic cylinder 74.

While the engine 26 is used as the drive power source in the above-described embodiment, any other drive power source may be used. For example, the drive power source includes both an engine and an electric motor.

The engine stop restricting means 90 in the above-described embodiment is configured to permit and inhibit stopping of the engine 26 depending upon whether the parking brake lever 52 is placed in the operated state or not (SA4) when a command signal to stop the engine 26 is output, that is, to permit stopping of the engine 26 (in SA5) when the parking brake lever 52 is placed in the operated state, and not to permit stopping of the engine 26 (in SA6) when the parking brake lever 52 is placed in the released state. However, this configuration is not essential. For example, the engine stop restricting means 90 may be modified to inhibit stopping of the engine irrespective of whether the parking brake lever 52 is placed in the operated or released state when an abnormality is detected by the abnormality detecting means 84 (when the affirmative determination is obtained in SB1). This modification provides some degree of advantage.

The engine start restricting means 90 in the above-described embodiment is configured to inhibit and permit starting of the engine 26 depending upon whether the parking brake lever 52 is placed in the released state or not (SB3), when an abnormality is detected by the abnormality detecting means 84 (when the affirmative determination is obtained in SB2) while the command signal to start the engine 26 is detected (while the affirmative determination is obtained in SB1), that is, to inhibit starting of the engine 26 (in SB4) when the parking brake lever 52 is placed in the released state, and to permit starting of the engine 26 (in SB5) when the parking brake lever 52 is placed in the operated state. However, this configuration is not essential. For example, the engine start restricting means 90 may be modified to inhibit starting of the engine irrespective of whether the parking brake lever 52 is placed in the operated or released state, when an abnormality is detected by the abnormality detecting means 84 (when the affirmative determination is obtained in SB2) while the command signal to start the engine 26 is detected (while the affirmative determination is obtained in SB1). This modification provides some degree of advantage.

It is to be understood that various other changes not specifically described herein may be made in the present invention, without departing from the spirit of the invention.

The invention claimed is:

1. A control apparatus for a vehicle having a drive power source, a power transmitting device for transmitting a drive force generated by said drive power source to drive wheels, and a parking lock device for locking an output shaft of said power transmitting device when said power transmitting is placed in a power disconnecting state, said parking lock device being placed in a released state with a hydraulic pressure generated by an oil pump operated by the drive power source, the control apparatus comprising:

a drive-power-source start restricting portion configured to restrict starting of said drive power source when a component of a hydraulic device provided to operate said parking lock device has an operating failure that causes said parking lock device to be held in the released state, as compared with the starting when the component does not have said operating failure.

2. The control apparatus according to claim 1, wherein said drive-power-source start restricting portion inhibits the starting of said drive power source when a parking brake device provided to apply a parking brake to the vehicle is not operated to apply the parking brake to the vehicle.

3. A control apparatus for a vehicle having a drive power source, a power transmitting device for transmitting a drive force generated by said drive power source to drive wheels, and a parking lock device for locking an output shaft of said power transmitting device when said power transmitting is placed in a power disconnecting state, said parking lock device being placed in a released state with a hydraulic pressure generated by an oil pump operated by the drive power source, the control apparatus comprising:

a drive-power-source stop restricting portion configured to restrict stopping of said drive power source when a component of a hydraulic device provided to operate said parking lock device has an operating failure that causes said parking lock device to be held in the released state.

4. The control apparatus according to claim 3, wherein said drive-power-source stop restricting portion inhibits the stopping of said drive power source when a parking brake device provided to apply a parking brake to the vehicle is not operated to apply the parking brake to the vehicle.

* * * * *